US006956338B1

(12) United States Patent  
Clark et al.

(10) Patent No.: US 6,956,338 B1  
(45) Date of Patent: Oct. 18, 2005

(54) ANALOG CONTROL OF LIGHT SOURCES

(75) Inventors: Brett G. Clark, Whites Creek, TN (US); David W. Sellers, Franklin, TN (US)

(73) Assignee: MasonWare Partners, LLC, Nashville, TN (US)

( * ) Notice: Subject to any disclaimer, the term of this patent is extended or adjusted under 35 U.S.C. 154(b) by 0 days.

(21) Appl. No.: 10/638,475

(22) Filed: Aug. 12, 2003

(51) Int. Cl.$^7$ ............................................ H05B 37/00
(52) U.S. Cl. .................... 315/312; 315/316; 315/185 S; 362/800; 362/806
(58) Field of Search ................ 315/291, 307, 315/312, 316, 324, 185 S, 200 A; 362/800, 362/806, 802, 231, 30, 29

(56) References Cited

U.S. PATENT DOCUMENTS

| | | | |
|---|---|---|---|
| 4,420,711 A | 12/1983 | Takahashi et al. | ........... 315/291 |
| 6,016,038 A * | 1/2000 | Mueller et al. | ............. 315/291 |
| 6,239,716 B1 * | 5/2001 | Pross et al. | ............. 340/815.4 |
| 6,351,079 B1 * | 2/2002 | Willis | ..................... 315/200 A |
| 6,498,440 B2 * | 12/2002 | Stam et al. | .................. 315/291 |
| 6,567,009 B2 * | 5/2003 | Ohishi et al. | .......... 340/815.45 |
| 6,614,191 B2 * | 9/2003 | Van Lydegraf | ............. 315/291 |
| 2002/0048177 A1 | 4/2002 | Rahm et al. | |
| 2002/0140378 A1 | 10/2002 | Volk et al. | |
| 2004/0116039 A1 * | 6/2004 | Mueller et al. | ............. 446/220 |
| 2004/0245946 A1 * | 12/2004 | Halter | ........................ 315/312 |

FOREIGN PATENT DOCUMENTS

| | | |
|---|---|---|
| EP | 1 152 642 A2 | 4/2001 |
| JP | 7-35787 | 2/1995 |

OTHER PUBLICATIONS

Patent Abstracts of Japan, Publication No. 07035787, Feb. 7, 1995.

* cited by examiner

*Primary Examiner*—Tuyet Thi Vo
(74) *Attorney, Agent, or Firm*—Banner & Witcoff, Ltd.

(57) ABSTRACT

Analog control of a plurality of light sources, such as light-emitting diodes (LEDs), to generate multiple colors of light. An electronic circuit controls three or more analog outputs in response to a single analog input, each of the analog outputs controlling a different one of the light sources.

14 Claims, 4 Drawing Sheets

ANALOG CONTROL OF LIGHT SOURCES

FIELD OF THE INVENTION

Aspects of the present invention are directed generally to the analog control of light sources such as light-emitting diodes (LEDs). Aspects of the present invention may, for example, control a set of light sources in an analog manner to generate and transition between different colors of light, and/or control other types of systems.

BACKGROUND

With the availability of high-brightness and low-cost LEDs in primary colors (e.g., red, green, and blue), many applications have been developed for a variable color light source. These applications may be purely decorative or may be used for purposes of indicating a status.

The majority of the designs to control these three-color ("RGB") sources have used digital techniques. Typically, these have used a programmable micro-controller such as a PIC. The brightness of the LEDs has been controlled by pulse width modulation (PWM) or pulse frequency modulation (PFM) techniques. Programmable digital control of LEDs is popular because it offers several advantages in that it is flexible and can be remotely addressed and controlled. An example of such a programmable digital control technique is found in U.S. Pat. No. 6,016,038 to Mueller, et al.

However, digital techniques have several disadvantages as well. The PWF or PFM waveforms used by the controller clocks and the LED control outputs generate substantial electromagnetic interference (EMI) and radio frequency interference (RFI) from audio frequencies up to several Megahertz. Such interference can prevent convenient use of these devices in some applications, or require the use of shielding and grounding to prevent interference with nearby communications and entertainment electronics. EMI regulatory barriers may further increase the expense of using these devices. It is therefore desirable to find ways to control multi-color light sources in a way that reduces EMI and/or RFI interference.

Also, programmable digital controllers are becoming relatively more expensive compared to the LEDs that they are controlling. When blue LEDs were first introduced, they were quite expensive, and thus not suitable for some cost-sensitive applications. The cost of a programmable digital controller was a small fraction of the total system price. However, more recently, the cost of LEDs has dropped substantially, causing the control electronics to represent an increasing fraction of the total device cost. Therefore, the relative expense of programmable controllers has also become a disadvantage, and it is becoming increasingly desirable to find a more cost-efficient alternative.

SUMMARY OF THE INVENTION

Aspects of the present invention are directed to methods and apparatuses for control the color output of a multi-color set of light sources such as LEDs in an analog fashion. A set of light sources each emitting a different color may be controlled to output light from a single one of the light sources or a blend of light from multiple ones of the set of light sources. By varying the voltage of a single analog control signal over a continuous range of voltages, the currents passing through the light sources may be variably controlled.

Further aspects of the present invention are directed to controlling a plurality of different colored light sources in an analog manner, wherein at least one of the light sources is directly controlled and at least another of the light sources is indirectly controlled. For example, in a system having red, green, and blue light sources, two of the colors may be directly controlled in accordance with an analog control signal while the third color is indirectly controlled in accordance with how much current is being passed through the first two color light sources.

Still further aspects of the present invention are directed to controlling a plurality of different colored light sources in an analog manner, wherein a budgeted amount of current is divided among one or more of the light sources, in accordance with an analog control signal.

These and other aspects of the invention will become apparent to one of ordinary skill in the art upon a reading of the following description, drawings, and the claims.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
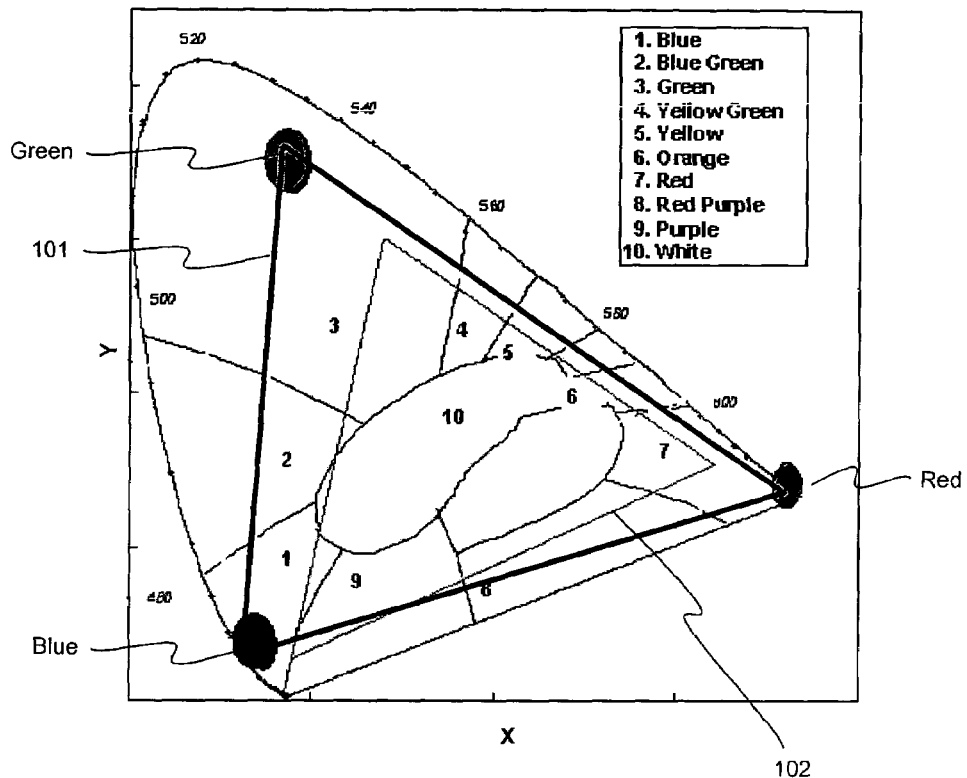
FIG. 1 is a CIE chromaticity chart.

Referring to FIG. 1, the International Commission on Illumination (CIE) chromaticity chart is shown. In the chart, the entire range of visible color is shown (independent of brightness). The "pure" spectral colors are shown by the long curved line which begins in the lower left and moves along the "rainbow" sequence from blue, past green, and then into red. The three-digit numbers along this rainbow curve represent wavelength in nanometers. An illustrated inner triangle 102 encloses the range of an ordinary CRT display, such as a computer monitor or television. An illustrated larger triangle 101 encloses the range attainable by an illustrative red-green-blue (RGB) LED triplet (for example, using LEDs marketed by Nichia Corporation).

Also shown are ten illustrative regions of color, ranging from blue (region 1), to orange (region 6), to white (region 10). The colors on the periphery of a larger triangle 101 represent the most "saturated" or "pure" colors attainable with the RGB triplet. Moving towards the center of the larger triangle 101, the colors become more pale ("pastel") as they approach pure white, which is at the center (i.e., the center of region 10).

Complete control of an RGB LED triplet is inherently a three-variable problem, whether the three variables are "Red, Green, Blue" or "Hue, Saturation, Brightness." However, in many applications, brightness may remain a constant or may be controlled separately. Either way, ignoring the brightness reduces the variables to two, such as the X and Y coordinates of the CIE chromaticity chart. However, direct control by these two variables (e.g., a pair of X and Y user controls) is not intuitive for the user and provides many possible control inputs which do not have valid unique output states. Also, there is no straightforward way to translate these variables into brightness levels for each of three LED's in an RGB triplet.

In many decorative lighting applications, it may be desirable to use fully saturated colors at the maximum available brightness of the LEDs, in which case only the hue might be controlled, thus reducing control to a one-variable problem. Controlling fully-saturated hue represents a progression along a defined path that, in this instance, is the periphery of the range defined by the primary color light sources available, such as along the perimeter of the larger triangle 101 in FIG. 1. To do so, appropriate control signals for each LED in an RGB LED triplet may be derived from a single variable to control the total light output color of the triplet by addressing a position along the defined path. As will be discussed below, that single variable may be represented by a single control input signal.

Figure 2:
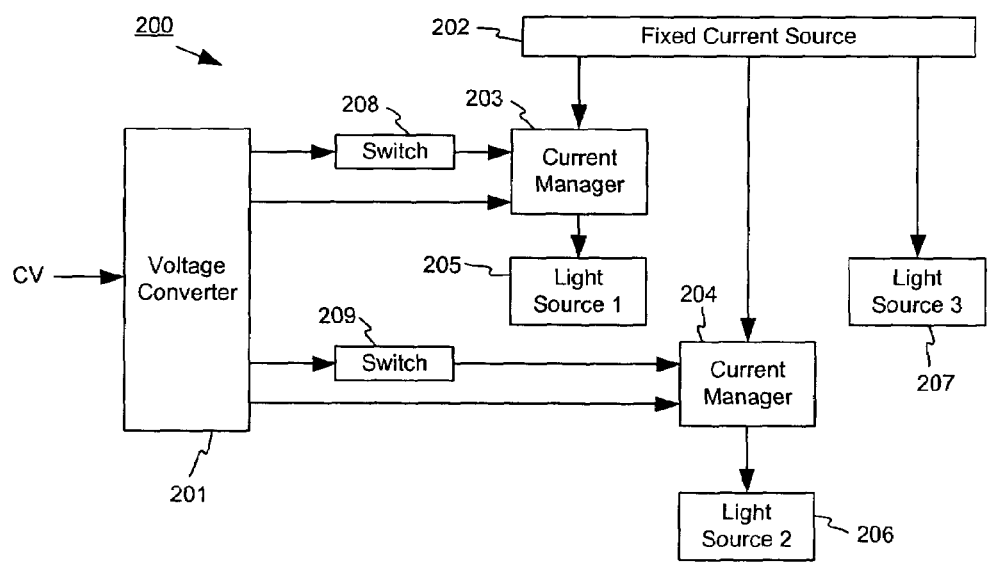
FIG. 2 is a functional block diagram of an illustrative analog light source controller in accordance with at least one aspect of the present invention.

To show how hue may be controlled in an analog manner, an illustrative functional block diagram of an analog controller 200 is shown in FIG. 2. The analog controller 200 may receive a single analog input signal CV. The input signal CV may represent a command in accordance with the amount of voltage and/or current of input signal CV. A voltage converter 201 converts the voltage and/or current of CV into one or more other voltages that are suitable to control various portions of the analog controller 200. For example, the voltage converter 201 may receive the voltage of CV and step down (or amplify) that voltage to one or more other voltages that are distributed to other portions of the analog controller 200. The voltage converter 201 may include one or more electrical components, such as a network of diodes, transistors, and/or resistors, suitable for generating one or more output voltages in response to a single analog input voltage.

One or more of these converted voltages may be distributed to one or more controllable current managers 203, 204. The current managers 203, 204 in turn are each coupled to a respective light source 205, 206. Each current manager 203, 204 acts as a sort of gate that allows a certain amount of current to pass through its respective light source 205, 206. The current managers 203, 204 each control the amount of current that can pass in accordance with, e.g., one of the converted voltages that is generated by the voltage converter 201. The current managers 203, 204 may each include one or more transistors, and may each be configured as a voltage-controlled current sink (VCCS) or other current management device.

One or more of the current managers 203, 204 may be controlled in accordance with one or more switches 208, 209. The switches 208, 209 may, in response to one or more of the converted voltages from the voltage converter, control whether and/or by how much the current managers 203, 204 operate. For example, switch 208 may control current manager 203 to either allow current to pass through or to bar all current from passing through. In this manner, the switches 208, 209 may each act as a voltage-controlled switch. In some embodiments, the switches 208, 209 only control the current managers 203, 204 to be either on or off (i.e., fully closed to current flow). In further embodiments, the switches 208, 209 control the current managers 203, 204 to operate up to a certain current flow capacity.

The current that ultimately flows through the light sources 205, 206 may be derived from a fixed current source 202. The fixed current source 202 may provide a fixed budget of current at a given time. This fixed current budget may be varied as desired, such as by user control. The fixed current source 202 may further provide current to a third light source 207. Although three light sources are shown in FIG. 2, less or more light sources may be controlled. The total current provided by the fixed current source 202 may be distributed amongst the light sources 205, 206, 207. In other words, all of the current provided by the fixed current source 202 may ultimately pass through one or more of the light sources 205, 206, 207. The amount of current that passes through each light source may depend upon the current managers 203, 204 and/or the switches 208, 209. Note that the current that passes through the third light source 207 is shown as not being directly controlled by a current manager or a switch. In this embodiment, the third light source 207 is indirectly controlled. This is because the amount of current passing through the third light source is the amount of current remaining from the output of the fixed current source 202 after providing subtracting the amount of current passing through the directly-controlled light sources 205, 206.

By varying the amounts of current through each of the light sources 205, 206, 207, the light output brightnesses of the light sources 205, 206, 207 may be controlled. Where each of the light sources 205, 206, 207 are of a different light output color, the total light output color (the sum of the simultaneous blended light output from the light sources 205, 206, 207) may be varied.

Figure 3:
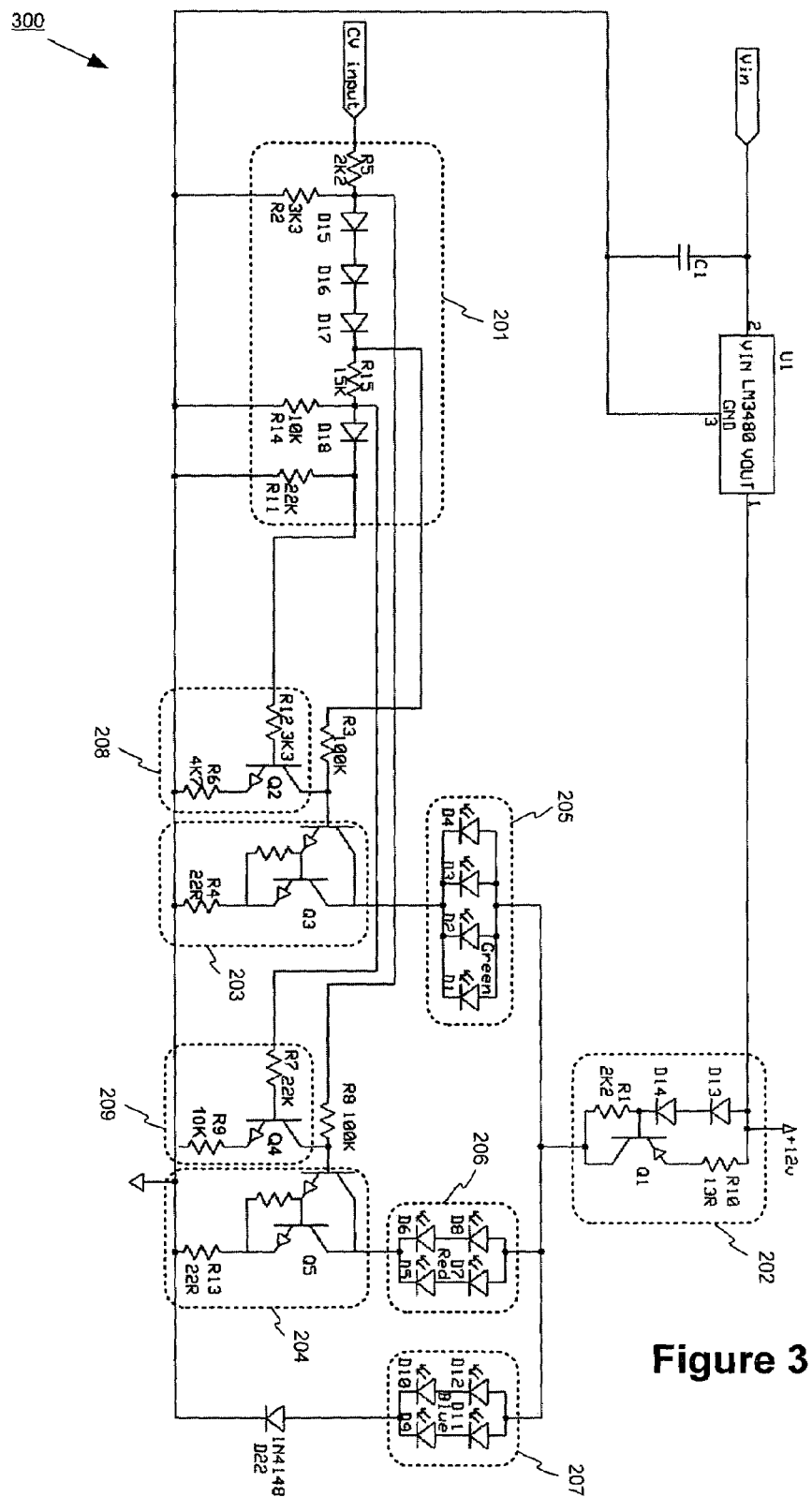
FIGS. 3 and 4 are schematic diagrams of illustrative analog LED control circuits in accordance with at least one aspect of the present invention.

Referring to FIG. 3, an illustrative analog control circuit 300 is shown that is consistent with the functional block diagram of FIG. 2. The analog control circuit 300 accepts unregulated direct current (DC) voltage (e.g., 12 to 20 Volts) at Vin. Capacitor C1 and National Semiconductor LM3480 integrated circuit U1 together form a regulator circuit that provides regulated DC voltage (e.g., 12 VDC) to the rest of the control circuit 300. The control circuit 300 controls light sources 205, 206, 207, which may include LEDs D1 through D12. At least some of the LEDs D1–D12 may be of different colors. For example, LEDs D1–D4 emit green light, LEDs D5–D8 emit red light, and LEDs D9–12 emit blue light. Thus, in this example, LEDs D1 through D12 together effectively form an RGB triplet. The set of light sources 205, 206, 207 in the present example include a red light source, a blue light source, and a green light source. These three colors are a group of primary colors However, other primary or non-primary colors may be used, and less than or more than three colors may be used. Also, some or all of the various LEDs D1–D8 may each be separately packaged light elements and/or may be grouped together as a single physical package. For example, a single LED chip capable of generating several different colors (such as a triplet set of primary colors) simultaneously, and having separate inputs for each color, may be used.

Transistor Q1, resistors R1 and R10, and diodes D13 and D14 together may form the fixed current source 202. In the present example, the output of the fixed current source 202 is 46 mA DC, however, other amounts of current may be generated. Moreover, the amount of fixed current that the fixed current source 202 provides at any given time may be controlled and varied. The fixed current source 202 may provide all of the current available to the light sources 205, 206, 207. As LEDs typically have approximately a linear relationship between brightness and current, this may be expected to provide a near-constant total brightness across the entire range of hues. In the present embodiment, all of the current generated by the fixed current source 202 eventually passes through at least some of the light sources 205, 206, 207. Thus, in the present embodiment, if the currents through all of the light sources 205, 206, 207 were to be summed, they would total the amount of current generated by the fixed current source 202.

Transistor Q3 (which may be a Darlington transistor as shown or other type of transistor) and resistor R4 may together form the current manager 203, and more particularly may form a VCCS in this embodiment. The current draw of the current manager 203 in the particular shown embodiment is defined by: $I=(1.2-V_{BE})/13$, where I is the current draw of the current manager 203 and $V_{BE}$ is the base-to-emitter voltage of transistor Q3 (in this example, approximately 0.6V). In this example, the current manager 203 controls the amount of current through, and thus the brightness of, the green LEDs D1–D4. Transistor Q5 (which may be a Darlington transistor as shown or other type of transistor) and resistor R13 together may also form the current manager 204, which may be a VCCS of the same type, controlling the red LEDs D5–D8 in this example. Thus, the respective groups of the green LEDs D1–D4 (light source 205) and the red LEDs D5–D8 (light source 206) are each VCCS controlled. In the shown embodiment, the remaining group of blue LEDs D9–D12 (light source 207) is indirectly controlled according to how much current is available beyond what is consumed by the VCCS-controlled LED groups. Thus, the amount of current passing through LEDs D9–D12 is indirectly controlled and depends upon how much current is controlled to pass through LEDs D1–D8. Although each current manager 203, 204 is shown coupled to its light source on a side opposite the fixed current source 202, the current managers 203, 204 may be on the same side of their respective light sources as the fixed current source 202.

The forward voltages across LEDs are often different depending on the color and chemistry of the LEDs. Typically, red LEDs have constant forward voltages of approximately 1.2–1.8 V, green LEDs have constant forward voltages of approximately 2.4–3.6 V, and blue LEDs have constant forward voltages of approximately 3.0–3.8 V. However, LEDs or other light sources having other constant or variable forward voltages may be used. In the example of FIG. 3, the red LEDs D5–D8 each have a constant forward voltage of 1.8V, the green LEDs D1–D4 each have a constant forward voltage of 3.6V, and the blue LEDs D9–D12 each have a constant forward voltage of 3.6V.

The LEDs D1–D12 are shown as being grouped by color to form three light sources 205, 206, 207, each light source having four LEDs (each LED being considered a light source element). However, light sources may have different numbers and/or types of light source elements, and/or the light source elements may be individual instead of grouped. Where grouped, the LEDs in a light source may be coupled together in parallel (such as is the color group of LEDs D1–D4), in series (such as are LEDs D6 and D8), or in a mixture of both parallel and serial (such as is the color group of LEDs D5–D8). It may be determined whether to arrange a particular light source as a series, parallel or mixed group of LEDs in accordance with the particular forward voltages of the LEDs used. Where three colors of LEDs are used, as in the present example, it is preferable but not required to arrange the LEDs such that the two colors of light sources with VCCS control (in this example, the green and red light sources 205 and 206) each has approximately the same total forward voltage as the other, while the remaining light source (in this example, the blue light source 207) has a total forward voltage that is approximately twice as large as the forward voltages of the other two light sources.

The analog control circuit 300 may further have an input node for receiving a single analog control input signal CV. The voltage of the control input CV may determine which combinations or subcombinations of the light sources 205, 206, 207 generate light, and how much light is generated by each. Thus, the analog control input CV may control the total light output saturated hue, or color, of the light sources 205, 206, 207. The analog control input CV may be originally generated as an analog signal, or may be converted from a digital signal into an analog signal by a digital-to-analog converter.

In operation, consider the case in which the analog control input CV is 0V. Both of the current managers 203, 204 are turned fully off in the illustrative embodiment. Therefore, all of the current from the fixed current source 202 flows through the blue LEDs D9–D12, providing a pure blue total light output color. The currents that flow through the various light sources 205, 206, 207 in this embodiment are direct current.

As the analog control input CV is continuously increased to approximately 1.6V in the present embodiment, the base voltage of transistor Q5 becomes high enough (about 1V in this case) to cause some current to be drawn through the red LEDs D5–D8. This causes the balance of the total light output color to begin to move through the magenta/purple region, towards red. As the analog control input CV is further continuously increased to approximately 4V, transistor Q5 is drawing all of the available current through the red LEDs D5–D8, which pulls the voltage at the collector of transistor Q1 low enough that the blue LEDs D9–D12 are fully off. Therefore, the total light output color at this point is pure red. The input voltages for the remaining color transitions are set by a network of diodes D15–D18 in series with the CV input.

As the analog control input CV is continuously increased past 4.5V, transistor Q3 (with a 2.1V drop from diodes D15–D17) begins to turn on, causing the green LEDs D1–D4 to begin to illuminate and smoothly moving the total light output color towards yellow.

As the analog control input CV approaches 5V, transistor Q4 (with a 2.1V drop from diodes D15–D17) begins to turn on. This reduces the voltage at the base of transistor Q5 reducing the current through the red LEDs D5–D8. Therefore, the total light output color begins to smoothly shift towards green, reaching pure green when the analog control input CV is at approximately 6.9V.

As the analog control input CV is increased past 7V, transistor Q2 (with a 2.8V drop from diodes D15–D18) begins to turn on. This reduces the current passing through the green LEDs D1–D4. Since the VCCS Q5, R13 is now entirely clamped off by transistor Q4, the current not used by the green LEDs D1–D4 flows through the blue LEDs D9–D12. Therefore, the total light output color begins to shift into the cyan/turquoise/blue-green region. If the voltage of the analog control input CV is continuously increased yet further to 8.0V, the total light output color smoothly returns to pure blue. Table I summarizes the approximate states of the control circuit 300 for various voltages of control input CV, assuming that the current generated by the current source 202 is a constant 46 mA DC.

TABLE I

| CV (V) | Current through green light source 205 (mA) | Current through red light source 206 (mA) | Current through blue light source 207 (mA) | Switch 208 | Switch 209 |
|---|---|---|---|---|---|
| 0.0 | 0.0 | 0.0 | 46 | Off | Off |
| 1.6 | 0.0 | 1.0 | 45 | Off | Off |
| 4.0 | 0.0 | 46 | 0.0 | Off | Off |
| 4.5 | 1.0 | 45 | 0.0 | Off | Off |
| 5.0 | 23 | 23 | 0.0 | Off | Partially On |
| 6.9 | 46 | 0.0 | 0.0 | Off | Fully On |
| 7.0 | 45 | 0.0 | 1.0 | Partially On | Fully On |
| 8.0 | 0.0 | 0.0 | 46 | Fully On | Fully On |

Therefore, in response to a range of voltage of a single analog control input CV, the control circuit 300 has provided a corresponding range of saturated colors, having moved partially or completely around the periphery of the larger triangle 101 on the CIE diagram in FIG. 1. By variably increasing the current provided by the fixed current source 202, the analog control circuit 300 may produce less saturated colors by allowing all of the light sources 205, 206, 207 to be on simultaneously to some degree throughout the color change process. Of course, the voltages and currents described herein are merely illustrative, and other voltages and currents may be used and generated. Also, although the voltages of the analog control input CV are discussed in connection with the present example as being positive, the voltage of the analog control input CV may be positive and/or negative, depending upon the configuration of the control circuit.

Figure 4:
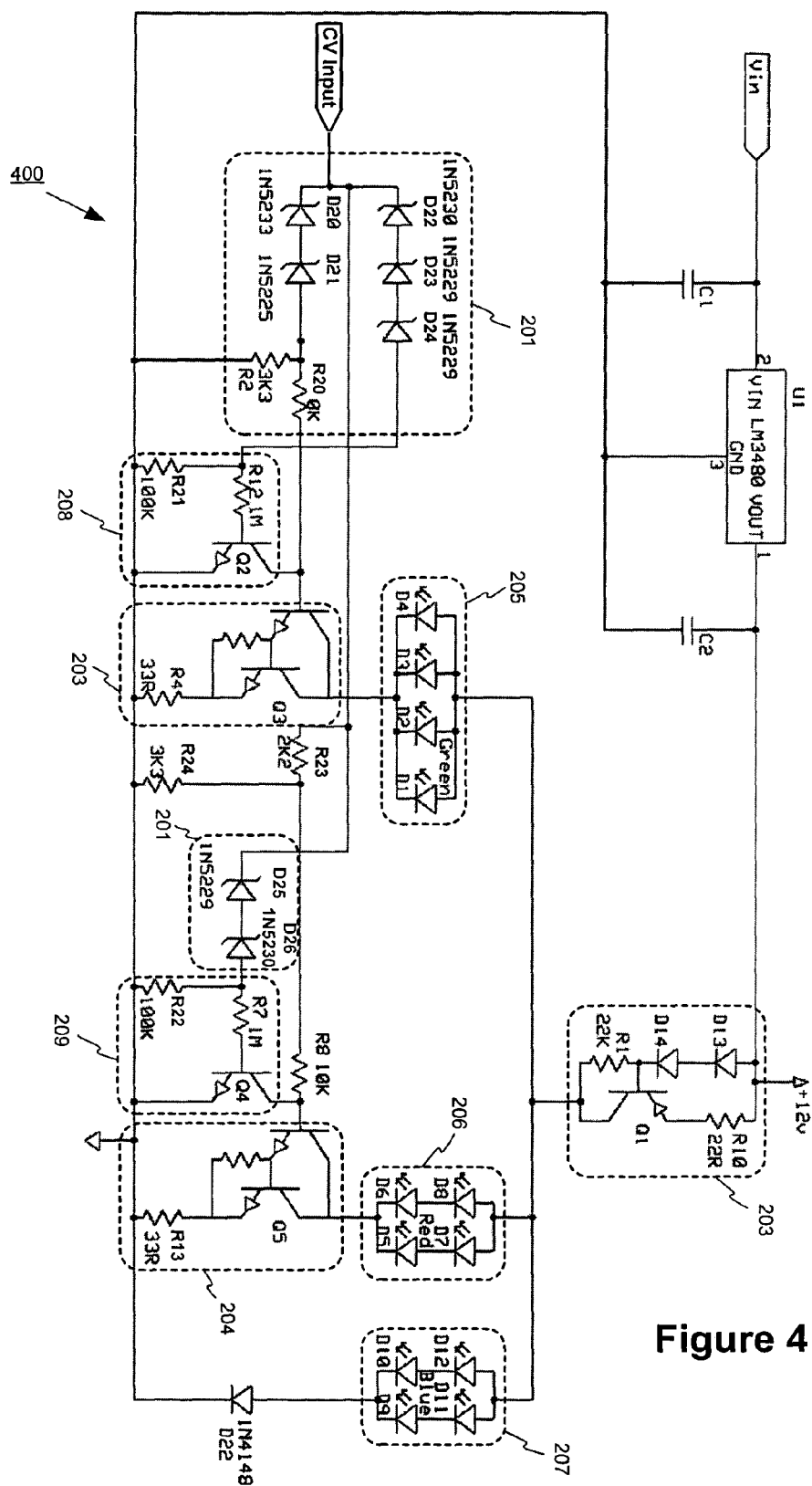

Moreover, true Zener type diodes, such as those with a Vz of less than 6V, may be used to provide smooth color transitions. An illustrative analog control circuit 400 as shown in FIG. 4 uses such Zener diodes. Zener diodes with voltage ratings of 6V and larger may actually be considered avalanche diodes, as they would use ionization effects to multiply minority charge carriers in their p-n junctions. These higher-voltage avalanche diodes have much sharper, non-linear turn-on transitions. Therefore, a network of diodes, such as one or more series sets of low-voltage Zener diodes, may be used to create a smooth, linear turn-on of the current managers 203, 204. These lower-voltage Zener diodes may begin to conduct at voltages much less than the rated "knee" voltage.

Figure 5:
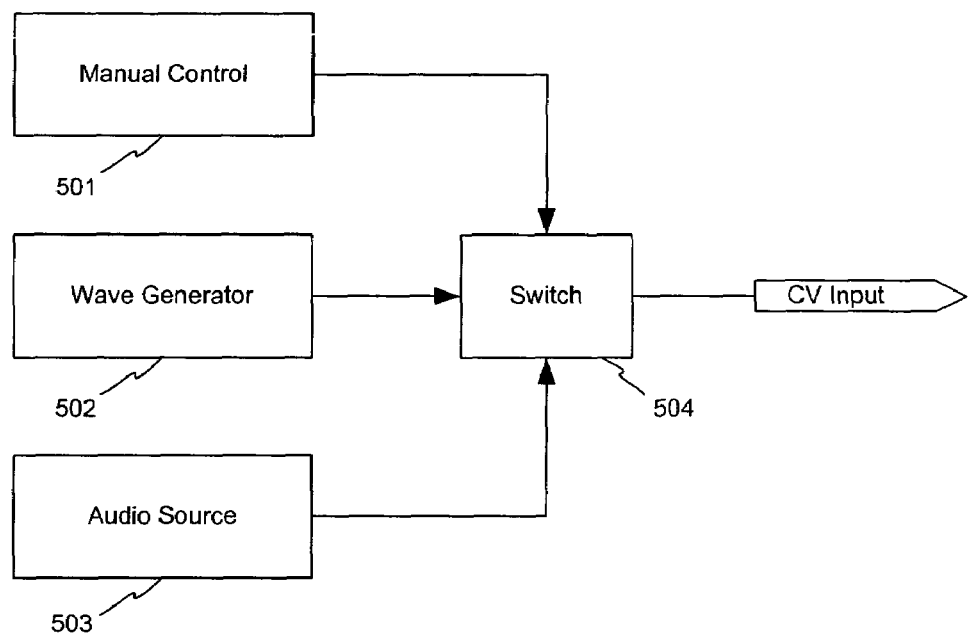
FIG. 5 is a functional block diagram of illustrative input sources coupled to an analog LED control circuit in accordance with at least one aspect of the present invention.

The analog control circuit 300 or 400 may be directly or indirectly coupled to one or more signal sources that feed into the analog control input CV. For example, referring to FIG. 5, a user-controlled manual control 501 may be provided, such as a knob, slide, dial, set of switches, and/or other such device that allows a user to control the voltage of the analog control input CV smoothly and continuously and/or in steps. Further, a wave generator 502, such as a triangle, sine, or square wave generator, may be provided to output a changing voltage over time that feeds into the analog control input CV. The wave generator 502 may output a wave at a relatively slow rate such that the total light output color transitions are apparent to the human eye. Further, the analog control input CV may receive from an audio source 503 (e.g., a radio, a compact disc player, stereo system, etc.) an output voltage that varies in accordance with audio (e.g., music) generated by the audio source 503. Where an audio source 503 is used, the output of the audio source 503 may pass through a low-pass filter to make the color transitions more apparent to the human eye. One or more of the sources 501, 502, 503 may be coupled to the analog control input CV via a switch 504, such as a three-way switch.

Thus, a simple and cost-effective apparatus and method for controlling a plurality of light sources has been presented. An otherwise three-variable color lighting system is thus controllable using only a single variable. By simply varying an analog input signal, a range of colors may be generated in accordance with the different values of the analog input signal. Because pulse width modulation and pulse frequency modulation are not necessary, and direct current may instead be used, electromagnetic interference and radio frequency interference may be reduced or even eliminated.

Aspects of the present invention are not limited to control of color lighting systems, however. Other multi-variable systems may also be controlled in a simplified manner. For example, known surround-sound amplifier and speaker systems can cause sound to appear to be emitted from a particular location in three-dimensional space. Such a system could be controlled using a single variable in a manner similar to single-variable control of a lighting system. This may be done where the single variable addresses a particular location along a defined path in space from which the sound is to appear to be emitted. Another example of such a multi-variable system is a positioning system that physically positions an element via, e.g., a plurality of motors (such as servo motors). The positioning system may be capable of moving the element within a three-dimensional space. However, aspects of the present invention may be used to simplify control of such movement by a single variable. Similar to the surround-sound system, this may be done where the single variable addresses a particular location (e.g., distance) along a defined path in space.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, the invention has been defined using the appended claims, however these claims are exemplary in that the invention is intended to include the elements and steps described herein in any combination or sub combination. It will also be appreciated and understood that modifications may be made without departing from the true spirit and scope of the invention.

What is claimed is:

1. An analog control circuit for a plurality of light sources, comprising:
    a first voltage-controlled current sink coupled to a first light source and controlling the first light source;
    a second voltage-controlled current sink coupled to a second light source and controlling the second light source;
    a first voltage-controlled switch coupled between a control input of the first voltage-controlled current sink and a first potential;
    a second voltage-controlled switch coupled between a control input of the second voltage-controlled current sink and the first potential; and
    an input node for receiving an analog input, the input node controlling the first and second voltage-controlled current sinks and the first and second voltage-controlled switches in accordance with the analog input.

2. The analog control circuit of claim 1, wherein the first voltage-controlled switch is activated in response to a first voltage of the analog input, and the second voltage-controlled switch is activated in response to a second voltage, different from the first voltage, of the analog input.

3. The analog control circuit of claim 1, wherein the first and second voltage-controlled switches are each a transistor.

4. The analog control circuit of claim 3, wherein the first and second current sinks are each a Darlington transistor, the first and second voltage-controlled switches each being coupled between a base of the respective Darlington transistor and an emitter of the respective Darlington transistor.

5. An analog control circuit for a plurality of light sources, comprising:
   a control input node for receiving an analog input signal;
   a diode network coupled to the control input node and generating a first voltage and a second voltage in response to the analog input signal, the second voltage being different from the first voltage;
   a first current sink variably controlling an amount of current passing through a first light source in accordance with the first voltage; and
   a second current sink variably controlling an amount of current passing through a second light source in accordance with the second voltage.

6. The analog control circuit of claim 5, wherein the diode network includes a plurality of Zener diodes each having a voltage value Vz of less than 6V.

7. The analog control circuit of claim 5, further including a third light source through which a third current passes, the third current depending upon the first and second currents.

8. The analog control circuit of claim 7, wherein the first, second, and third currents sum to a total fixed current.

9. The analog control circuit of claim 5, further including a first switch coupled across the first current sink, wherein the diode network further generates a third voltage different from the first and second voltages, the first switch controlling in accordance with the third voltage whether the first current sink is on or off.

10. The analog control circuit of claim 9, further including a second switch coupled across the second current sink, wherein the diode network further generates a fourth voltage different from the first, second, and third voltages, the second switch controlling in accordance with the fourth voltage whether the second current sink is on or off.

11. An analog control circuit for a plurality of light sources, comprising:
    an input node configured to receive an analog control signal;
    a first current path configured to pass first current through a first light source, the first current being directly controlled in accordance with the analog control signal;
    a second current path configured to pass second current through a second light source, the second current being directly controlled in accordance with the analog control signal; and
    a third current path configured to pass third current through a third light source, the third current being indirectly controlled in accordance with the analog control signal;
    further including a current source configured to generate a fixed current, a sum of the first, second, and third currents totaling to be the fixed current.

12. A method for controlling a plurality of light sources, comprising steps of:
    receiving an analog input signal, the analog input signal changing over time between a plurality of voltage values;
    regulating a first amount of current through a first light source in accordance with the analog input signal;
    regulating a second amount of current through a second light source in accordance with the analog input signal; and
    passing a third amount of current through a third light source, the third amount of current depending upon the first and second amounts of current.

13. The method of claim 12, further including a step of a set of the first, second, and third light sources together generating light for each of the plurality of voltage values of the analog input signal.

14. The method of claim 12, further including a step of a set of the first, second, and third light sources together generating a different color of light for each of the plurality of voltage values of the analog input signal.

* * * * *